United States Patent [19]
Tetjuev et al.

[11] 3,848,657
[45] Nov. 19, 1974

[54] APPARATUS FOR ELECTROSLAG MELTING OF HOLLOW INGOTS

[76] Inventors: Vladimir Alexandrovich Tetjuev, ulitsa Uralskaya, 113, kv. 79, Perm; Boris Izrailevich Medovar, ulitsa Turgeneva, 33, kv. 6; Leonty Vasilievich Chekotilo, bulvar Lesi Ukrainki, 2, kv. 8; Valery Georgievich Popov, ulitsa Scherbakova, 49a, kv. 10, all of Kiev; Pavel Ivanovich Tjurikov, ulitsa Ezhena Potie, 9, kv. 7, Perm; Ivan Egorovich Kosmatenko, uliltsa Tekhnicheskaya, 15, kv., Perm; all of U.S.S.R.

[22] Filed: Dec. 29, 1972

[21] Appl. No.: 319,794

[52] U.S. Cl. .................................. 164/252, 164/85
[51] Int. Cl. ............................................. B22d 27/02
[58] Field of Search ....................... 164/52, 252, 85

[56] References Cited
UNITED STATES PATENTS 3,687,188  8/1972  Paton et al............................ 164/52
3,721,286  3/1973  Paton et al............................ 164/52

FOREIGN PATENTS OR APPLICATIONS
1,909,881  9/1970  Germany ............................. 164/85
  242,210  9/1969  U.S.S.R................................ 164/252

*Primary Examiner*—J. Spencer Overholser
*Assistant Examiner*—John E. Roethel
*Attorney, Agent, or Firm*—Holman & Stern

[57] ABSTRACT

An apparatus for electroslag melting of hollow ingots has a cooled crystallizer with a bottom plate and a mandrel having a drive for its vertical travel, and at least one consumable electrode whose position is fixed with respect to the crystallizer longitudinal axis. The mandrel is equipped with an extension assembly mechanically fixed-coupled with and electrically insulated from it and having rollers for centering the mandrel with respect to the crystallizer axis, a mandrel-faced lateral side of the consumable electrode serving as a guide for each of the rollers.

3 Claims, 3 Drawing Figures

APPARATUS FOR ELECTROSLAG MELTING OF HOLLOW INGOTS

BACKGROUND OF THE INVENTION

The present invention relates to apparatuses for electroslag melting of ingots having constant or variable cross-section.

One known apparatus for electroslag melting of hollow ingots comprises a cooled crystallizer having a bottom plate and a mandrel for forming a cavity or hollow in an ingot. This prior art apparatus has also an electrode holder in which at least one consumable electrode can be mounted. During the melting of hollow ingots, the position of electrodes is fixed relative to the crystallizer longitudinal axis. In this apparatus a mandrel is mounted on a rod kinematically connected with a drive for moving the mandrel in the vertical direction.

When too long ingots having the length of 2 to 3 meters and the opening diameter of the order of 100 to 150 millimeters are smelted, the rod on which the mandrel is cantilever mounted should have a small diameter, and for this reason the rod does not possess the rigidity required for maintaining the strictly rectilinear or vertical direction of the mandrel movement. In this case the deviation of the mandrel from the vertical axis of movement causes the variation of wall thickness in the ingot. The difference in the wall thickness may exceed 10 to 50 millimeters. Of course, such ingots are not suitable for further manufacture of products. At the same time the production of high-quality long hollow billets having constant wall thickness in cross-section is of prime importance, and the problem has been waiting its solution heretofore.

SUMMARY OF THE INVENTION

The primary object of the present invention is to provide an apparatus for electroslag melting of hollow ingots having the length of the order of 2 to 3 meters which will ensure the smelting of hollow ingots with walls of constant thickness in its each cross-section.

These and other objects are achieved in an apparatus for electroslag melting of hollow ingots comprising a cooled crystallizer having a bottom plate and a mandrel for forming a hollow in an ingot and having a drive for effecting its vertical travel, and at least one consumable electrode mounted in an electrode holder, the position of the electrode being fixed relative to the crystallizer longitudinal axis wherein, according to the invention, the mandrel has an extension assembly mechanically fixed-coupled therewith and electrically insulated therefrom, the extension assembly having rollers for centering said mandrel relative to the crystallizer axis, mandrel-faced lateral sides of the consumable electrode serving as guides for each of said rollers.

The apparatus according to the invention permits the production of hollow cylindrical or conical ingots with walls of a pre-set thickness.

The inner lateral surface of a single tubular consumable electrode inside whose cavity or hollow centering rollers are arranged may be employed as a common guide for all centering rollers.

Tubular consumable electrodes employed in the apparatus according to the invention permit the use of an electrode holder featuring a simple construction and ensure a relatively high space factor of the crystallizer.

The mandrel-faced lateral side of one of solid or rod-type consumable electrodes arranged along the periphery coaxially with the crystallizer and mandrel may be used as a guide for each of the centering rollers.

Accordingly, simple consumable electrodes in the form of individual rods can be employed in the inventive apparatus.

BRIEF DESCRIPTION OF THE DRAWINGS

The present invention will now be described in more detail with reference to a particular embodiment thereof and to the accompanying drawings, wherein.

DETAILED DESCRIPTION OF THE PREFERRED EMBODIMENT

Figure 1:
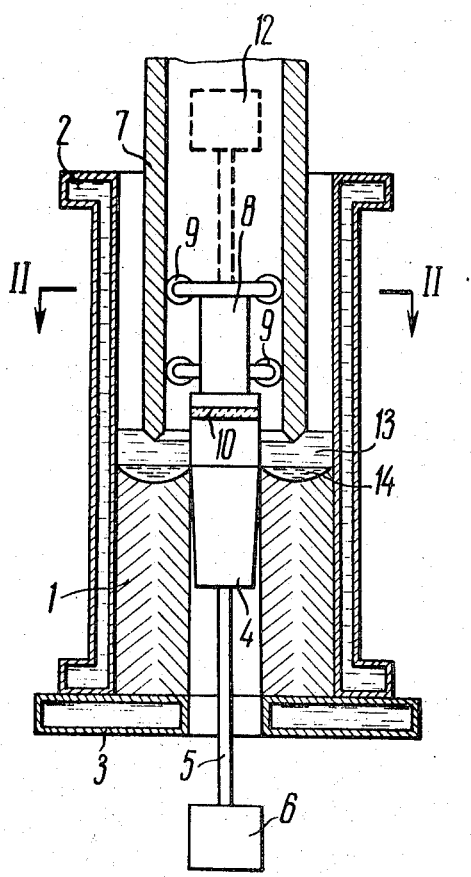
FIG. 1 is a longitudinal elevation view of the apparatus according to the invention.
Figure 2:
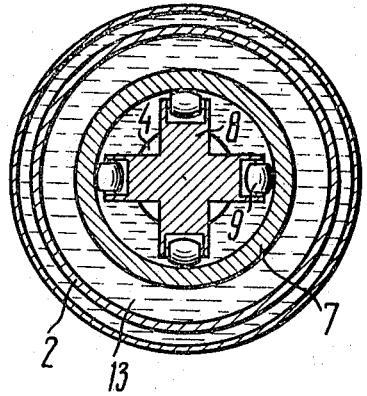
FIG. 2 is a cross-sectional view taken through FIG. 1 on the plane of line II—II.

Now referring to FIGS. 1 and 2, the apparatus for electroslag melting of hollow ingots has a cooled crystallizer 2 with a bottom plate 3 of annular shape and a mandrel 4 mounted on a rod 5 of drive 6 for vertical travel. A hollow consumable electrode 7 is fixed in an electrode holder (not shown).

Mandrel 4 has an extension assembly 8 including rollers 9 for centering the mandrel with respect to the longitudinal axis of crystallizer 2. Extension assembly 8 is electrically insulated from mandrel 4 by means of an insulating spacer 10 and mechanically fixed-coupled with the mandrel. Insulating spacer 10 may be made of asbestos, asbestos cement or any other insulation material capable of withstanding temperatures of the order of 1,000° C.

When a single hollow consumable electrode 7 is employed, the inner side surface of this single consumable electrode 7 inside whose cavity or hollow centering rollers 9 are arranged may be used as a common guide for all centering rollers 9.

Figure 3:
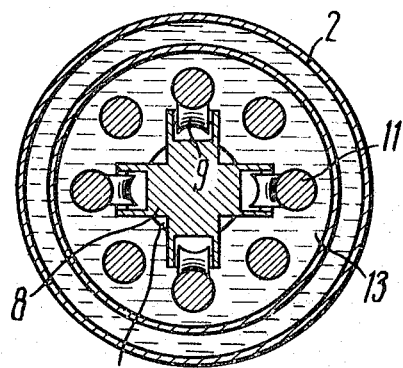
FIG. 3 is a top view of the apparatus according to the invention employing a plurality of consumable electrodes.

In an alternate embodiment of the inventive apparatus, as shown in FIG. 3, a plurality of rod-type or solid consumable electrodes 11 arranged along the periphery coaxially with mandrel 4 may be used instead of a single consumable electrode 7. In this case each of centering rollers 9 has an individual guide which is a side surface facing mandrel 4 of one of rod-type consumable electrodes 11. For better contact with the guides rollers 9 are provided with concave surfaces.

A drive 12 coupled with mandrel 4 at the top may be used instead of a bottom-connected drive 6 for moving mandrel 4.

The operation of the apparatus according to the invention is as follows:

A cooled crystallizer 2 is mounted on a cooled annular bottom plate 3.

A tubular consumable electrode 7 or a plurality of rod-type of solid consumable electrodes 11 arranged along the periphery coaxially with crystallizer 2 and mandrel 4 are introduced into crystallizer 2. Mandrel 4 mounted on rod 5 of drive 6 for effecting its vertical travel is inserted from the bottom through the opening in bottom plate 3.

Centering rollers 9 are brought into the cavity or hollow of a tubular consumable electrode 7. Tubular electrode 7 has its lateral side facing mandrel 4 used a guide for centering rollers 9.

When rod-type or solid consumable electrodes 11 are employed, a corresponding mandrel-faced side surface of one of a plurality of solid consumable electrodes 11 arranged along the periphery coaxially with crystallizer 2 and mandrel 4 will serve as a guide for each of centering rollers 9.

Since extension assembly 8 is electrically insulated from mandrel 4 by an insulating spacer 10, no short-circuiting occurs when the electric power is fed to the apparatus. Tubular consumable electrode 7 is fixed coaxially with crystallizer 2, and therefore mandrel 4 is also coaxial with crystallizer 2 due the provision of centering rollers 9, extension assembly 8 and a rigid or fixed connection of the extension assembly with mandrel 4. In its turn, this provision provides for the production of hollow ingots with walls of constant thickness.

As soon as liquid flux 13 is poured in, the building-up and forming of an ingot 1 is started under molten metal bath 14.

Consumable electrode 7 is lowered down as it is partially melted, if its cross-sectional area is less than that of ingot 1, or fixed on crystallizer 2, if the cross-sectional areas of consumable electrode 7 and ingot 4 being builded-up are equal.

As the building-up of ingot 4 proceeds, mandrel 4 is moved up by means of a drive 6 or 12 in accordance with the building-up speed.

Due to centering rollers 9, mandrel 4 will not shift relative to the longitudinal axis of crystallizer 2.

At the completion of the melting the consumable electrode 7 or a plurality of electrodes 12 and the mandrel 4 are raised up to avoid the gripping of the bottom part of mandrel 4 by hollow ingot 1 as a result of its solidification shrinkage.

The tests carried out with the apparatus described above have shown that the present invention permits the production of high-quality, long hollow billets or ingots with walls of a pre-set thickness which may be directly used as works and having a cylindrical or conical shape.

We claim:

1. An apparatus for electroslag melting of hollow ingots, said apparatus comprising: a cooled crystallizer; a bottom plate for said cooled crystallizer; a mandrel for forming a cavity in an ingot, said mandrel being introduced into said crystallizer; a drive for moving said mandrel in the vertical direction; at least one consumable electrode mounted in an electrode holder and adapted for melting an ingot in said cooled crystallizer; and an extension assembly for said mandrel, said extension assembly being mechanically fixed-coupled with said mandrel and electrically insulated therefrom and having rollers for centering said mandrel, mandrel-faced lateral sides of said consumable electrode serving as guides for each of said rollers.

2. An apparatus as set forth in claim 1, wherein an inner side surface of a single tubular consumable electrode inside whose cavity said centering rollers are arranged is used as a common guide for all said centering rollers.

3. An apparatus as set forth in claim 1, wherein a mandrel-faced side surface of one of a plurality of solid consumable electrodes arranged along the periphery coaxially with said crystallizer and said mandrel is used as a guide for each of said centering rollers.

* * * * *